United States Patent [19]

Nelson et al.

[11] 4,090,121

[45] May 16, 1978

[54] CONTROL CIRCUIT

[75] Inventors: Robert A. Nelson, Souderton; Glenn Saul, Ambler, both of Pa.

[73] Assignee: Honeywell Inc., Minneapolis, Minn.

[21] Appl. No.: 721,761

[22] Filed: Sep. 9, 1976

[51] Int. Cl.² ............................................. G05B 11/36
[52] U.S. Cl. .................................... 318/610; 318/678
[58] Field of Search ....................... 318/610, 678, 609;
330/1 A; 323/100

[56] References Cited

U.S. PATENT DOCUMENTS

| | | | |
|---|---|---|---|
| 3,377,548 | 4/1968 | Newbold | 318/610 X |
| 3,441,836 | 4/1969 | Riley | 318/610 |
| 3,819,999 | 6/1974 | Platt | 318/609 |

*Primary Examiner*—Robert K. Schaefer
*Assistant Examiner*—John J. Feldhaus
*Attorney, Agent, or Firm*—Laurence J. Marhoefer; Lockwood D. Burton

[57] ABSTRACT

A process controller which has at least a derivative control mode includes a comparison amplifier wherein a measured variable signal is compared with a set-point signal to produce an error signal. An auxiliary control circuit including a signal level change detector is connected to detect changes in the set-point signal. During intervals of constant set-point signal, the primary control circuit operates normally. Upon the occurrence of a change in the set-point signal, the change is detected by the auxiliary control circuit and produces an auxiliary control signal which is applied to momentarily inhibit the operation of the derivative control function of the controller.

7 Claims, 1 Drawing Figure

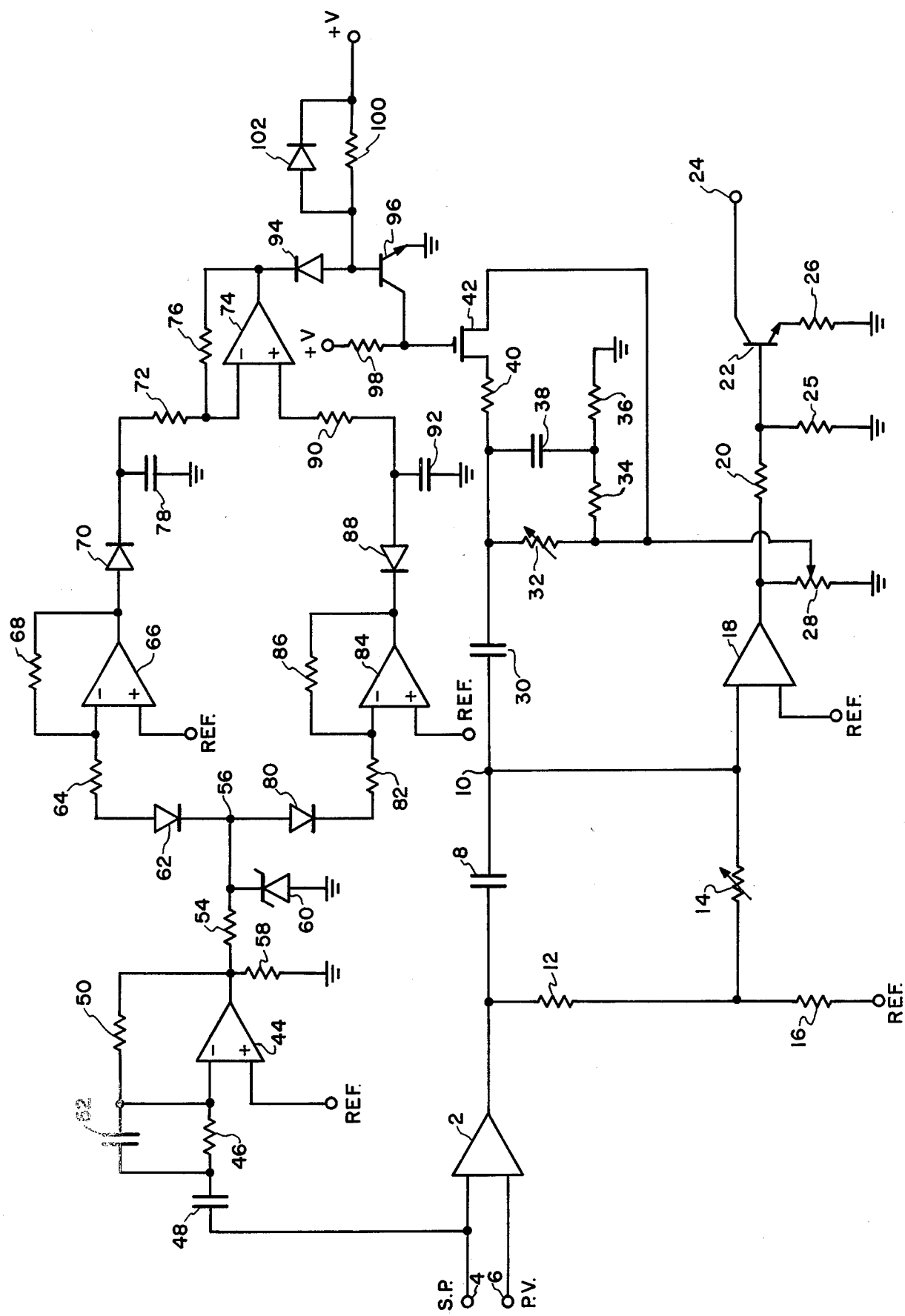

4,090,121

CONTROL CIRCUIT

BACKGROUND OF THE INVENTION

1. Field of the Invention

The present invention relates to an electrical control circuit, and more particularly to a control circuit for selectively manipulating the derivative function of a controller.

2. Description of the Prior Art

In the art relating to process control circuitry, one preferred form of such control circuit is known as a three-mode controller. That term refers to the three modes of characterization of an error signal which has been found desirable to accomplish a desired control function. In such circuits, a signal representative of a process variable is compared with a reference or set-point signal to produce an error signal, a signal representative of the difference between the measured value of the process variable and the desired value of the process variable. That error signal is then subjected to the three modes of characterization to produce a control signal. The first of these three modes is known as proportional control and is effected through controlling the amplification factor of the controller. The second mode of characterization is known as an integral function or "reset". This characterization produces a rising output signal so long as the measured variable deviates from the set-point value. The third mode of characterization produces an output signal which is a function of the rate of change of the error signal. In the three mode controller, the output signal is a function of the combined influence of all three of these characterization modes. Thus, a step change in the error signal would produce an ultimate output signal which has an initial high spike which diminishes to the level of the proportional signal then gradually rises at a rate determined by the circuit parameters so long as the error signal exists. This is a desirable characteristic when the step change in the error signal is occasioned by the sudden change in the process variable signal. A similar step change in the error signal would occur if the set-point signal were changed. Such a characterized output signal would not be desirable when the step change in the error signal is occasioned by a change in the set-point signal. In the known circuits heretofore provided, such as that shown in Gormley et al, U.S. Pat. No. 3,530,389, the circuit is incapable of distinguishing between a step change in the error signal caused by the process variable change or a step change in the error signal caused by a set point change. The portion of the characterized signal which is undesirable with respect to step changes occasioned by the change is set-point is the initial spike or derivative mode function.

SUMMARY OF THE INVENTION

It is, accordingly, an object of the present invention to provide an improved controller which obviates the foregoing shortcomings.

It is another object of the present invention to provide an improved controller as set forth including means for distinguishing set-point changes from process variable changes.

In accomplishing these and other objects, there has been provided, in accordance with the present invention, a process controller having at least a derivative control mode and wherein a set-point signal is compared with a process variable signal to produce an error signal at the output of the first stage or deviation amplifier. An auxiliary control circuit including a detector circuit is connected to the set point input terminal to detect changes in the set-point signal. When no change has occurred in the set-point signal, the detector circuit remains quiet and the control circuit operates in a usual manner. Whenk however, the change in the set-point signal is detected, an auxiliary control signal is generated which is applied to control the operation of the controller to momentarily eliminate the derivative function, thereby preventing the initial spike in the output signal of the controller which would otherwise have resulted from the resulting step change in the error signal.

BRIEF DESCRIPTION OF THE DRAWINGS

A better understanding of the present invention may be had from the following detailed description when read in the light of the accompanying drawing in which the single FIGURE is a schematic block diagram of a circuit embodying the present invention.

DETAILED DESCRIPTION

Referring now to the drawing in detail, there is shown, in the single FIGURE, a three-mode controller comprising a first stage amplifier, or deviation amplifier 2, having a pair of input terminals 4 and 6. The input terminal 4 is arranged to have a set-point signal applied thereto while the input terminal 6 is arranged to have a process variable signal applied thereto. The output of the amplifier 2 is connected through a first capacitor 8 to a summing junction 10. Shunting the capacitor 8 is a first fixed resistor 12 and a second or variable resistor 14. The junction between the resistors 12 and 14 is connected through a third resistor 16 to a source of reference potential which may be on the order of 3.3 volts.

The summing junction 10 is connected to one input terminal of the controller operational amplifier 18. The other input terminal of the operational amplifier 18 is connected to a reference voltage source which may, for example, be on the order of 3.3 volts. The output terminal of the amplifier 18 is connected through a pair of resistors 20 and 25 forming a voltage divider to ground. The junction between the resistors 20 and 25 is connected to the base electrode of an output current control transistor 22. The collector of the transistor 22 is connected to an output terminal 24 while the emitter is connected through a resistor 26 to ground. A slidewire resistor 28 is connected between the output terminal of the operational amplifier 18 and ground. A feedback signal for the operational amplifier 18 is taken from the slider associated with the slidewire resistor 28 and fed back through a derivative network to a feedback capacitor 30, thence to the summing junction 10. The adjustment of the slider on the slidewire resistor 28 in conjunction with the ratio of the capacitors 8 and 30 determine the gain of the amplifier 18 and, hence, constitute the "proportional" characterization of the output signal from the controller. The capacitor 8 together with the resistors 12 and 14 comprise the means for accomplishing the "integral" or "reset" characterization of the signal. The adjustable resistor 14 provides the means for effecting an adjustment of the integration time constant.

The derivative circuit includes the variable resistor 32, the fixed resistors 34 and 36 and the capacitor 38. Under ordinary circumstances, a step change at the output of the amplifier 18 would be applied to the derivative circuit through the proportional slidewire as a feedback signal. However, the capacitor 38 would tend to shunt the feedback signal to ground allowing the amplifier 18 to operate as an open loop circuit, momentarily, for a period determined by the time constant of the derivative network.

As was previously mentioned, if the derivative spike occurs as a result of a change in set-point, the control system may be unbalanced in certain processes. To avoid such an unbalance, there is provided a shunt circuit around the derivative network, the shunt circuit comprising a resistor 40 and an FET switch 42. When the FET switch is opened, that is, non-conductive, the derivative network operates in the usual manner. When, however, the FET switch is conductive, or closed, the feedback signal from the proportional slidewire 28 is fed through the conductive path of the FET and the relatively small resistor 40 to the feedback capacitor 30 thereby eliminating the effect of the characterization of the derivative network. To render the FET conductive whenever there is a change in set-point signal, there is provided a set-point signal change detector circuit.

The set-point signal change detector circuit includes a capacitor, or a.c., coupled amplifier 44. The inverting input terminal of the amplifier 44 is connected through a resistor 46 and a capacitor 48 to the set-point input terminal 4. A feedback resistor 50 is connected between the output terminal of the amplifier 44 and the inverting input terminal of the amplifier. The shunt capacitor 52 is connected across the input resistor 46. The output terminal of the amplifier 44 is connected through a coupling resistor 54 to a junction 56. A load resistor 58 is connected between the output terminal of the amplifier 44 and ground. The non-inverting input terminal of the amplifier 44 is connected to a source of fixed reference potential which may be on the order of 3.3 volts. In order to limit the magnitude of a positive signal applied to the junction 56, there is provided a zener diode 60 connected between the junction and ground.

Inasmuch as changes in the set-point signal can be made in either a positive or a negative direction means are provided for detecting either of such changes. To accomplish that, there are two amplification branches coupled to the junction 56. One of the branches responds to negative going signals while the other responds to positive going change signals. The upper of these branches includes a diode 62 having its cathode connected to the junction 56 and its anode connected through a coupling resistor 64 to the inverting input of operational amplifier 66. The non-inverting input of the operational amplifier 66 is connected to a point of reference potential which, again, may be of the order of 3.3 volts. The feedback resistor 68 connected between the output of the amplifier 66 and the input thereof completes the operational amplifier structure. The output of the amplifier 66 is connected to the anode or diode 70, the cathode of which is connected through a resistor 72 to the inverting input of an operational amplifier 74 and including a feedback resistor 76. A capacitor 78 is connected between the cathode of the diode 70 and ground.

The lower of the two branches connected to the junction 56 includes a diode 80 having its anode connected to the junction 56 and its cathode connected through a coupling resistor 82 to the inverting input terminal of an operational amplifier 84 having a feedback resistor 86. The non-inverting input terminal of the amplifier 84 is, again, connected to a point of reference potential which may also be on the order of 3.3 volts. The output of the amplifier 84 is connected to the cathode of a diode 88. The anode of the diode 88 is connected through a coupling resistor 90 to the non-inverting input terminal of the operational amplifier 74. A capacitor 92 is connected between the anode of the diode 88 and ground.

The output terminal of the operational amplifier 74 is connected to the cathode of a diode 94, the anode of which is connected to the base of a transistor 96. The emitter of the transistor 96 is connected to ground while the collector is connected to the gate electrode of the FET switch 42 and through a dropping resistor 98 to a positive voltage supply. The junction between the anode of the diode 94 and the base of the transistor 96 is connected through a large resistor 100 to a positive voltage supply. A diode 102 is connected in shunt with the resistor 100 with the anode thereof connected to the junction between the diode 94 and the transistor 96.

In the quiescent state, that is, with no change being evidenced on the set-point input terminal, the input to the amplifier 74 is balanced with a positive voltage being applied to the base of the transistor 96 rendering that transistor fully conductive. With that transistor 96 being conductive, the gate electrode of the FET 42 is effectively clamped to substantially ground potential thereby biasing the FET 42 to the non-conductive state.

On the occasion of a change in the set-point signal applied to the terminal 4, that change is reflected through the a.c. coupled amplifier 44 to produce an inverted output or intermediate signal at the terminal 56. If the change signal appearing at the terminal 56 were in a negative direction, that signal would be permitted to decrease all the way to ground potential. If, however, the change signal appearing at the terminal 56 were in a positive direction, the magnitude of that change is limited by the zener diode 60. Thus, if the normal quiescent potential at the junction 56 were on the order of 3.3 volts, the zener diode 60 might limit the positive excursion to a potential on the order of 6 volts. A change in the potential at the junction 56 in a negative direction would be transmitted by the diode 62 to the inverting input of the amplifier 66 to produce a positive going signal at the output thereof. The positive signal at the output of the amplifier 66 would be transmitted by the diode 70 to the inverting input of the amplifier 74 thereby producing a negative going output signal from the amplifier 74 through the diode 94 to the base electrode of the transistor 96, thereby rendering the transistor 96 non-conductive. The non-conductive state of the transistor 96 allows the positive voltage through the resistor 98 to be applied to the gate electrode of the FET switch 42 thereby rendering the FET switch conductive. The conductive state of the FET switch 42 bypasses the derivative network of the control circuit thereby eliminating the derivative spike that otherwise would have been incident to the change in set point signal. The capacitor 78 serves as a brief memory to maintain the positive signal on the inverting input of the amplifier 74 for a predetermined time long enough to allow the system to stabilize before restoring the derivative circuit to an active condition.

On the other hand, if the change signal appearing at the junction 56 is in a positive direction, that signal will be transmitted through the diode 80 to the inverting input of the amplifier 84. The amplified outputs of the amplifier 84 will be a negative going signal which is transmitted by the diode 88 to the non-inverting input terminal of the amplifier 74. The negative going signal applied to the non-inverting input of the amplifier 74 produces a negative going signal at the output thereof. As before, the negative going signal at the output of the amplifier 74 is applied through the diode 94 to the base electrode of the transistor 96, rendering that transistor non-conductive. The non-conductive state of the transistor 96 allows the positive voltage to be applied to the gate electrode of the FET switch 42 rendering that switch conductive. The conductive state of the FET switch 42, again, bypasses the derivative network on the occasion of a change in the set point signal. The capacitor 92 also serves as a short-term memory to maintain the FET switch 42 in the conductive state for a period predetermined to be long enough to allow the system to stabilize after a set-point signal change.

Thus there has been provided, in accordance with the present invention means for blocking the derivative action of a three mode controller on the occasion of a change in set point, irrespective of whether the change in set point is in a positive or negative direction.

The embodiment of the invention in which an exclusive property or privilege is claimed are defined as follows:

1. In a controller circuit having means for comparing a measured variable signal with a set-point to produce an error signal, and having means to produce at least derivative characterization of said error signal, said derivative characterization means including an R-C derivative network connected in a feedback loop of said controller circuit, the improvement comprising
   auxiliary control means responsive to changes in said set-point signal to selectively inhibit the operation of said derivative characterization means,
   said auxiliary control means including a detector circuit connected to be responsive to changes in said set-point signal to provide an auxiliary control signal, and
   means responsive to said auxiliary control signal to effect the inhibiting of the operation of said R-C derivative network.

2. In a controller circuit having means for comparing a measured variable signal with a set-point signal to produce an error signal, said controller circuit also including means for providing at least a derivative characterization of said error signal to provide a control signal, said derivative characterization means including an R-C derivative network connected in a feedback loop of said controller circuit, the improvement comprising
   auxiliary control means responsive to changes in said set-point signal to selectively inhibit the operation of said derivative characterization means,
   said auxiliary control means including a detector circuit connected to be responsive to changes in said set-point signal to provide an auxiliary control signal, and
   means responsive to said auxiliary control signal to effectively close a shunt path around said R-C derivative network.

3. In a controller circuit having means for comparing a measured variable signal with a set-point signal to produce an error signal, and having means for providing at least a derivative characterization of said error signal to provide a control signal, said derivative characterization means including an R-C derivative network connected in a feedback loop of said controller circuit, the improvement comprising
   auxiliary control means responsive to changes in said set-point signal to selectively inhibit the operation of said derivative characterization means,
   said auxiliary control means including a detector circuit connected to be responsive to changes in said set-point signal to provide an auxiliary control signal, and a field-effect transistor switch means responsive to said auxiliary control signal to effectively close a shunt path around said R-C derivative network.

4. In a controller circuit having means for comparing a measured variable signal with a set-point signal to produce an error signal, and having means for providing at least a derivative characterization of said error signal to provide a control signal, said derivative characterization means including an R-C derivative network connected in a feedback loop of said controller circuit, the improvement comprising
   auxiliary control means responsive to changes in said set-point signal to selectively inhibit the operation of said derivative characterization means,
   said auxiliary control means including an absolute value detector circuit connected to be responsive to changes in said set-point signal to provide an auxiliary control signal, and a field-effect transistor switch means responsive to said auxiliary control signal to effectively close a shunt path around said R-C derivative network.

5. In a controller circuit having means for comparing a measured variable signal with a set-point signal to produce an error signal, and having means for providing at least a derivative characterization of said error signal to provide a control signal, said derivative characterization means including an R-C derivative network connected in a feedback loop of said controller circuit, the improvement comprising
   auxiliary control means responsive to changes in said set-point signal to selectively inhibit the operation of said derivative characterization means,
   said auxiliary control means including an absolute value detector circuit connected to be responsive to changes in said set-point signal to provide an auxiliary control signal, a transistor control element, and a field-effect transistor switch means responsive, through said transistor control element, to said auxiliary control signal to effectively close a shunt path around said R-C derivative network.

6. In a controller circuit having means for comparing a measured variable signal with a set-point signal to provide an error signal, and having means for providing at least a derivative characterization of said error signal to provide a control signal, said derivative characterization means including an R-C derivative network connected in a feedback loop of said controller circuit, the improvement comprising
   auxiliary control means responsive to changes in said set-point signal to selectively inhibit the operation of said derivative characterization means,
   said auxiliary control means including an absolute value detector circuit connected to be responsive to changes in said set-point signal to provide an auxiliary control signal,
   said absolute value detector circuit including an a.c. coupled amplifier having an input terminal connected to a set-point signal means, and being responsive to changes in said set-point signal to produce an intermediate signal representative of said change in said set-point signal, a first and a second polarity sensitive branch circuit connected to be responsive to said intermediate signal, said first branch circuit being responsive to said intermediate signal when said intermediate signal is representative of a change of said set-point signal in a positive direction, said second branch circuit being responsive to said intermediate signal when said intermediate signal is representative of a change of said set-point signal in a negative direction, and an output amplifier responsive to signals on said branch circuits to produce said auxiliary control signal, and a field-effect switch means responsive to said auxiliary control signal to effectively close a shunt path around said R-C derivative network.

7. In a controller circuit having means for comparing a measured variable signal with a set-point signal to provide an error signal, and having means for providing at least a derivative characterization of said error signal to provide a control signal, said derivative characterization means including an R-C derivative network connected in a feedback loop of said controller circuit, the improvement comprising auxiliary control means responsive to changes in said set-point signal to selectively inhibit the operation of said derivative characterization means, said auxiliary control means including an absolute value detector circuit connected to be responsive to changes in said set-point signal to provide an auxiliary control signal, said absolute value detector circuit including an a.c. coupled amplifier having an input terminal connected to a set-point signal means, and being responsive to changes in said set-point signal to produce an intermediate signal representative of said change in said set-point signal, a first and a second polarity sensitive branch circuit connected to be responsive to said intermediate signal, said first branch circuit being responsive to said intermediate signal when said intermediate signal is representative of a change of said set-point signal in a positive direction, said second branch circuit being responsive to said intermediate signal when said intermediate signal is representative of a change of said set-point signal in a negative direction, a short-term memory device coupled to each of said branch circuits, and an output amplifier responsive to signals on said branch circuits to produce said auxiliary control signal, and a field-effect switch means responsive to said auxiliary control signal to effectively close a shunt path around said R-C derivative network.

* * * * *